United States Patent [19]
Louis et al.

[11] Patent Number: 5,863,309
[45] Date of Patent: Jan. 26, 1999

[54] HARD BAG DOOR WITH AIR DIRECTING ARRANGEMENT

[76] Inventors: Jeffrey S. Louis, 980 E. Nimisila Rd., Akron, Ohio 44319; Kurt D. Harsh, 5729 Glyn Dr., Northwest; David P. Parks, 8307 Cleveland Ave., Northwest, both of North Canton, Ohio 44720; William H. Theiss, 3914 Ennis Cir., Northeast, Canton, Ohio 44705-2864; David B. Rennecker, 5306 Beverly Ave., Northeast, Canton, Ohio 44714

[21] Appl. No.: 871,279

[22] Filed: Jun. 9, 1997

[51] Int. Cl.⁶ .................................................. B01D 45/08
[52] U.S. Cl. ........................... 55/368; 15/347; 15/353; 55/413; 55/416; 55/439; 55/DIG. 3
[58] Field of Search .................. 55/DIG. 3, 361, 55/368, 373, 276, 410, 413, 414, 416, 334, 439, 437; 15/347, 350, 353

[56] References Cited

U.S. PATENT DOCUMENTS

| | | | |
|---|---|---|---|
| 514,677 | 2/1894 | Furnas | 15/353 |
| 1,039,383 | 9/1912 | Goughnour | 15/415.1 |
| 1,110,344 | 9/1914 | Preston | 15/415.1 |
| 1,519,868 | 12/1924 | Marshall | 15/415.1 |
| 2,384,414 | 9/1945 | Antrim | 55/329 |
| 2,764,255 | 9/1956 | Beede | 55/211 |
| 2,958,893 | 11/1960 | Carlberg et al. | 15/327.7 |
| 3,184,778 | 5/1965 | Lindberg et al. | 15/344 |
| 3,218,783 | 11/1965 | Ripple | 55/276 |
| 3,233,392 | 2/1966 | Owenmark et al. | 55/410 |
| 3,273,195 | 9/1966 | Jepson et al. | 15/344 |
| 3,491,519 | 1/1970 | Ettridge | 55/373 |
| 3,675,268 | 7/1972 | Nordeen | 15/350 |
| 4,114,231 | 9/1978 | Nauta | 15/353 |
| 4,342,133 | 8/1982 | Minton | 55/DIG. 3 |
| 4,527,302 | 7/1985 | Maurer et al. | 15/325 |
| 4,670,937 | 6/1987 | Sumerau et al. | 15/352 |
| 4,709,443 | 12/1987 | Bigley | 55/DIG. 3 |
| 5,289,612 | 3/1994 | Glenn, III | 15/351 |

FOREIGN PATENT DOCUMENTS 600452  6/1960  Canada .

OTHER PUBLICATIONS

Two (2) Photographs of Eureka Model 4351 Hard Bag Door.
Photograph of Hoover PowerDrive Model U6323–930 Hard Bag Door—Introduced Jun. 21, 1994.
Photograph of Hoover Auto Drive Model U6319–930 Hard Bag Door—Introduced Feb. 14, 1996.

*Primary Examiner*—Duane S. Smith

[57] ABSTRACT

A hard bag cleaner door is disclosed having air directing rib vanes integral with its inner surface. These vanes take the form of, alternately, angled J-shaped ribs and short straight interleaved ribs. All the ribs are stepped so that the flow passage for air moving along the interior side of the bag door diverges as more bag air is introduced to it so that it directs efficiently air flow to a lower disposed motor-fan section of an adjoining hard bag portion.

13 Claims, 6 Drawing Sheets

HARD BAG DOOR WITH AIR DIRECTING ARRANGEMENT

BACKGROUND OF THE INVENTION

1. Field of the Invention

This invention relates to floor care appliances and, more specifically, to an airflow arrangement for a hard bag cleaner.

2. Summary of the Prior Art

The use of hard bag cleaners with air directing internal ribs in their bag cavities is well known. But, with the advent of the entrance of more cleaners having a clean air system in the marketplace, effective, efficient direction of dirt collecting bag discharge air towards such a cleaner's motor fan system has become more critical. Accordingly, it would be advantageous to provide a cleaner having a clean air system with a ventilating arrangement which, downstream of the bag, minimized back pressures, eddy currents, noise and the like so that an efficient flow path could be established through the dirt bag cavity to provide a more effective vacuum cleaner suction air system.

It is, therefore, an object of this invention to aid in the provision of a lower energy loss airflow path from dirt bag discharge to the cleaner suction fan.

It is another object of the invention to provide a series of airflow directing vanes within a hard bag cavity to guide dirt bag discharge air.

It is a further object of the invention to provide airflow guide vanes on the internal side of a panel of a hard bag cleaner.

It is an additional object of the invention to provide these guide vanes of the bag door of the hard bag cleaner.

It is a still further object of the invention to provide an improved internally vaned hard bag panel and/or bag door.

SUMMARY OF THE INVENTION

The invention is provided on the interior of a bag door of a hard bag cleaner. It consists of vaning formed by internal integral ribs disposed on the inside surface of this door. The bag door is roughly in the form of an open sided rectangle of somewhat curvilinear prismatic shape with the internal surface of this shape having the vaned ribs. A pair of medially disposed vertical ribs serve primarily for stiffening purposes. On either side of these two ribs are a series of guiding vanes formed by substantially J-shaped ribs interspersed by a series of short horizontally extending ribs. The tails of the "J" angle downwardly while the remainder of each J shape extends horizontally away from the two medial ribs towards the sides of the bag door. The J ribs are offset in a stepped manner at the center of the door so that as one approaches the bottom portions of the hard bag door a center expanding flow volume is formed on each side of the medial ribs. The short interleaved ribs also are stepped and aid to guide flow but function, more importantly, to prevent a dirt bag placed in the hard bag of the cleaner and having suction imposed on it to seal against the inner face of the hard bag door and thereby prevent air moving through it from freely flowing down along the bag door for eventual discharge from the bottom of hard bag portion of the hard bag cleaner. The J shaped ribs and the short horizontally extending ribs also extend wrappings around the inner sides of the hard bag door, again, for air guidance and to prevent bag sealing.

At the bottom of the hard bag door a series of integral short vertically and horizontally extending stepped ribs guide the flow of air moving along the bag door forwardly to a bottom exit afforded by the hard bag portion.

The hard bag portion, although not included in this invention, itself, is also formed with vent ribs extending along its sides which, with the bag door assembled, aid in the direction of bag exhaust air and prevent side bag sealing to it. The hard bag portion also includes generally a handle mounting structure, a bag mounting boss, some vertically extending air directing ribbing and the exhaust for the bag cavity. Air flows downwardly within the hard bag portion to be discharged from its exhaust so as to then flow to an integral fan-motor housing section of the hard bag portion.

BRIEF DESCRIPTION OF THE DRAWINGS

Reference now may be had to the accompanying Drawings for a better understanding of the invention, both as to its organization and function, with the illustration being of a preferred embodiment, but being only exemplary, and in which.

DETAILED DESCRIPTION OF THE INVENTION

Figure 1:
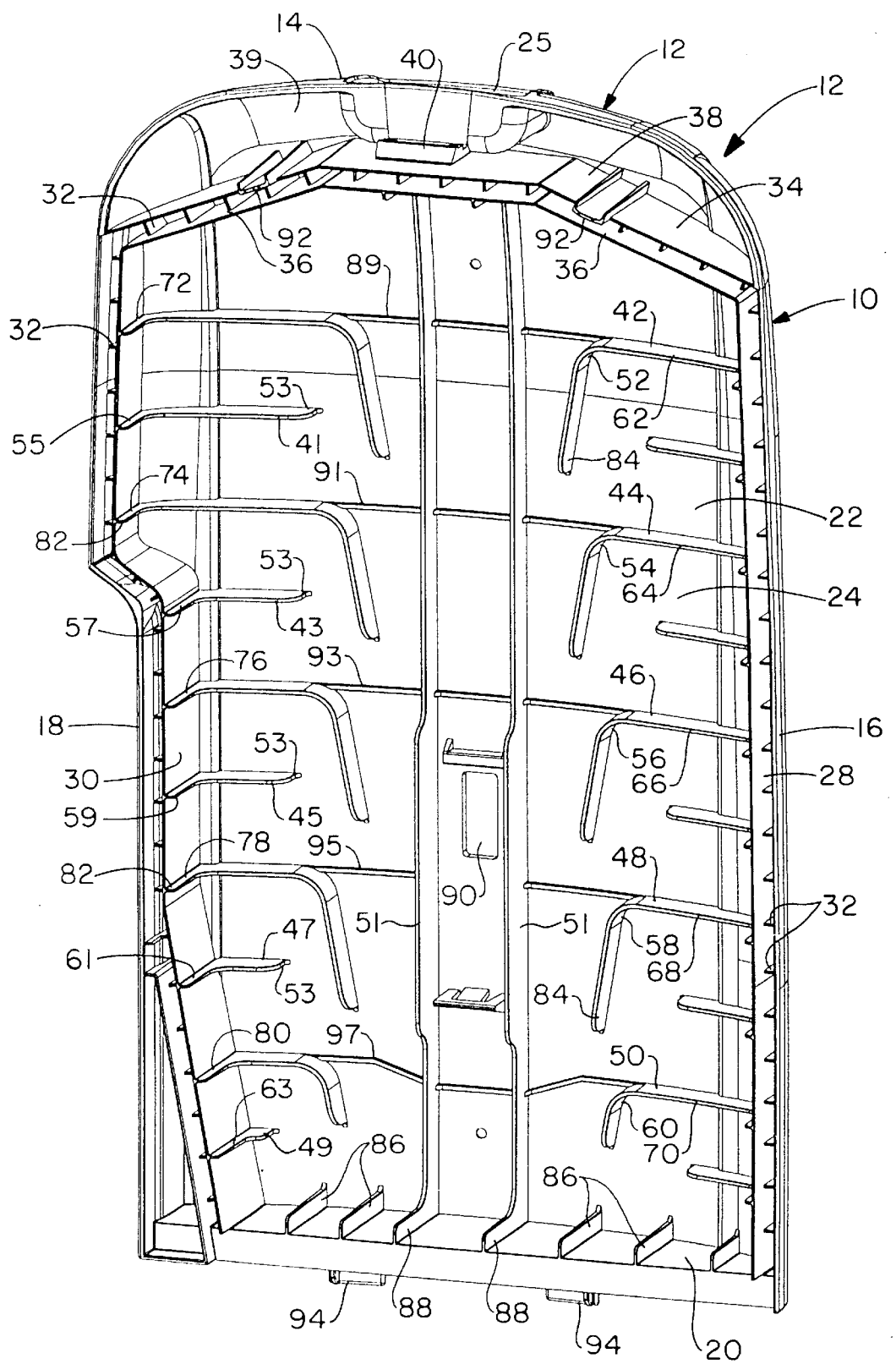
FIG. 1 is a left inside perspective view of a bag door that encompasses the invention and looking downwardly.
Figure 2:
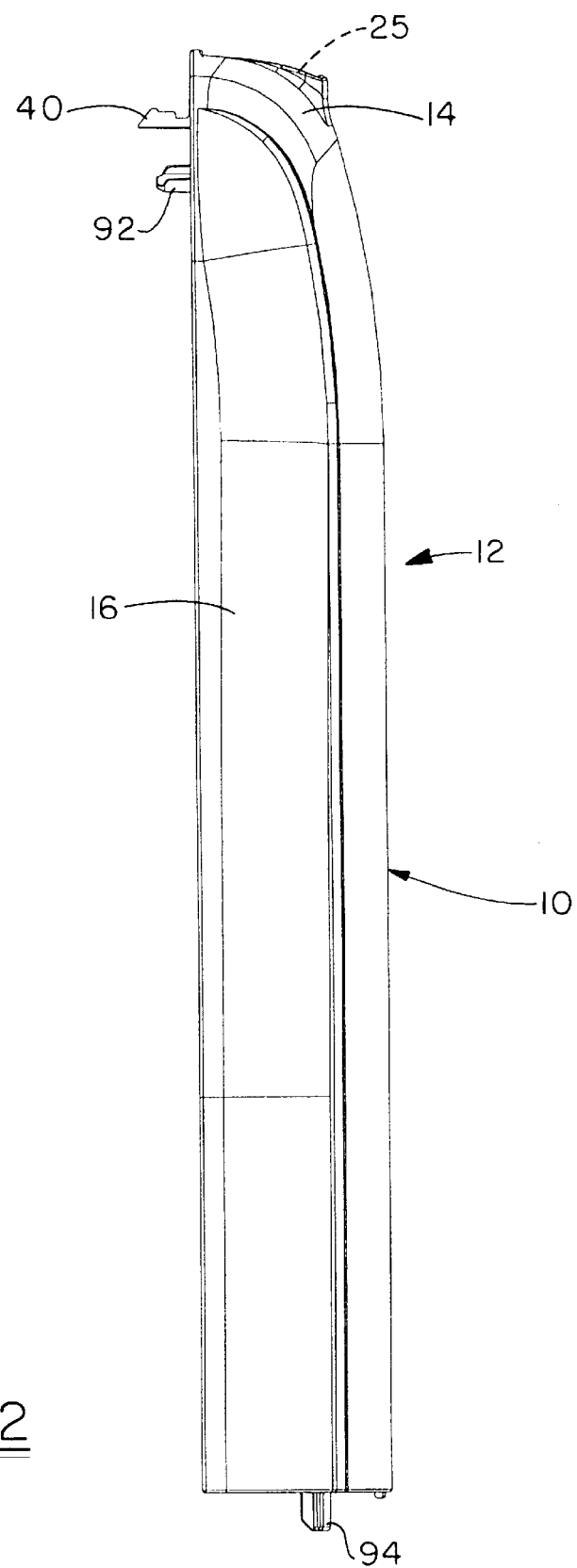
FIG. 2 is a left side elevational view thereof.
Figure 3:
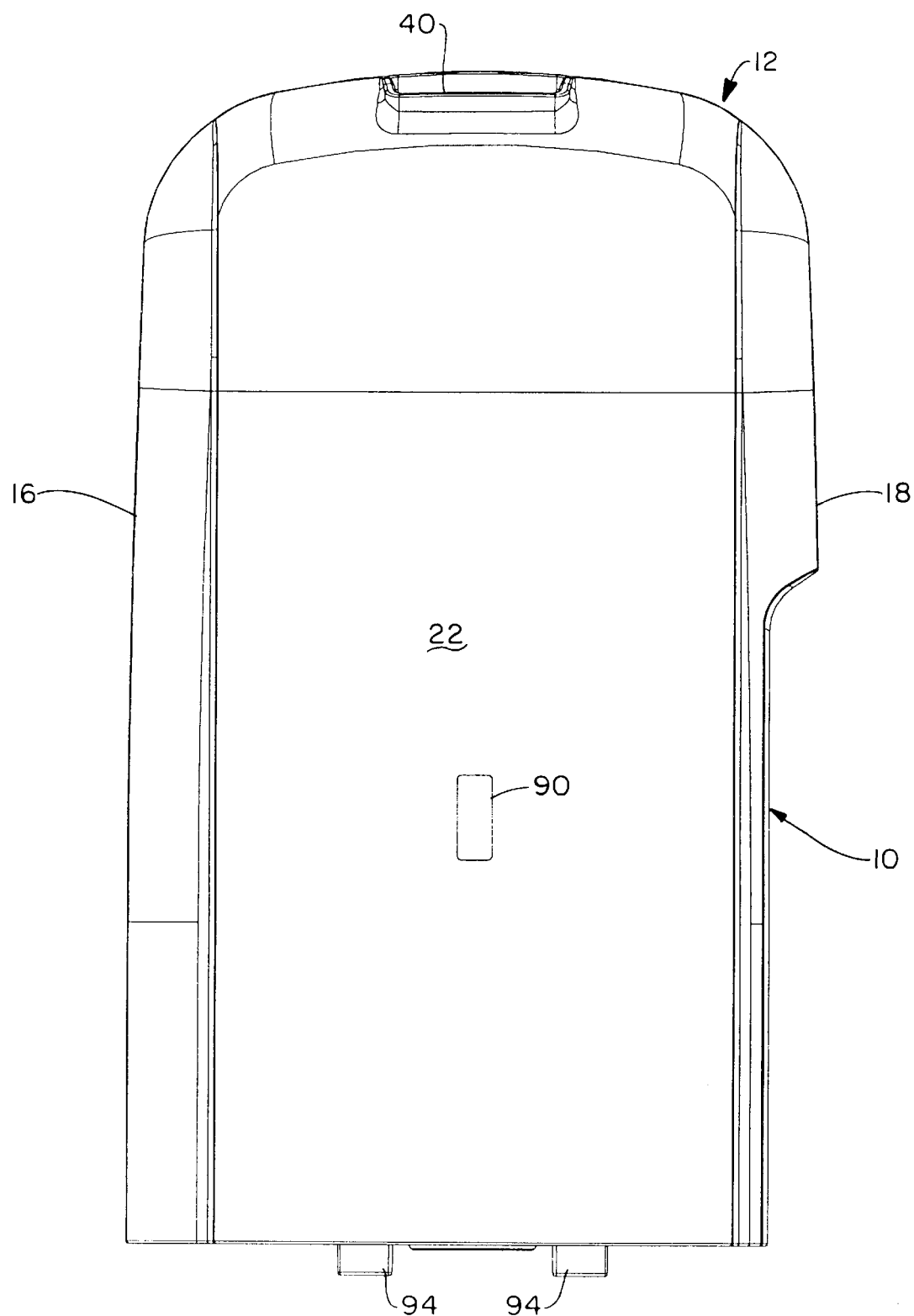
FIG. 3 is an obverse elevational view thereof.
Figure 4:
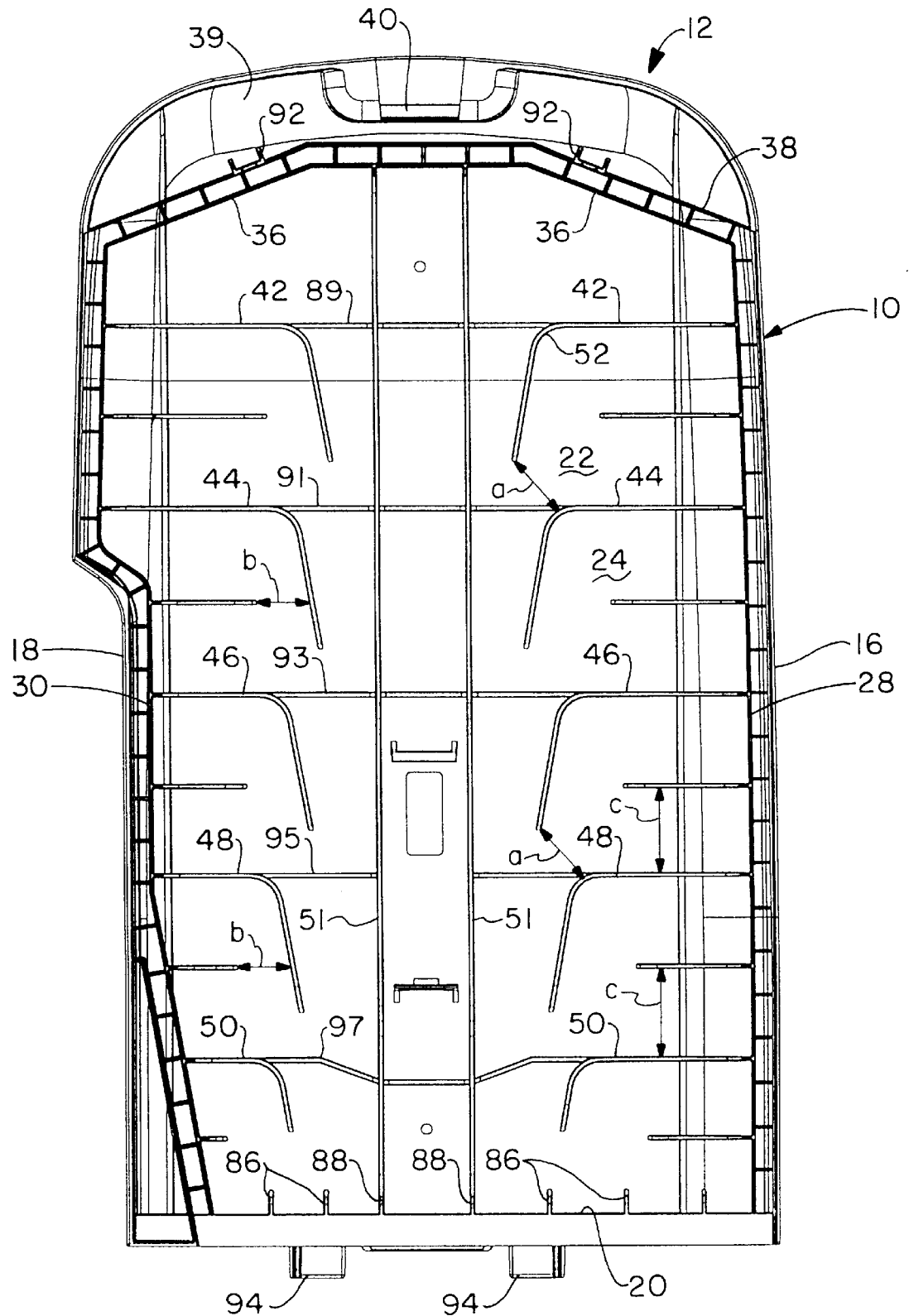
FIG. 4 is an inside elevational view thereof.
Figure 5:
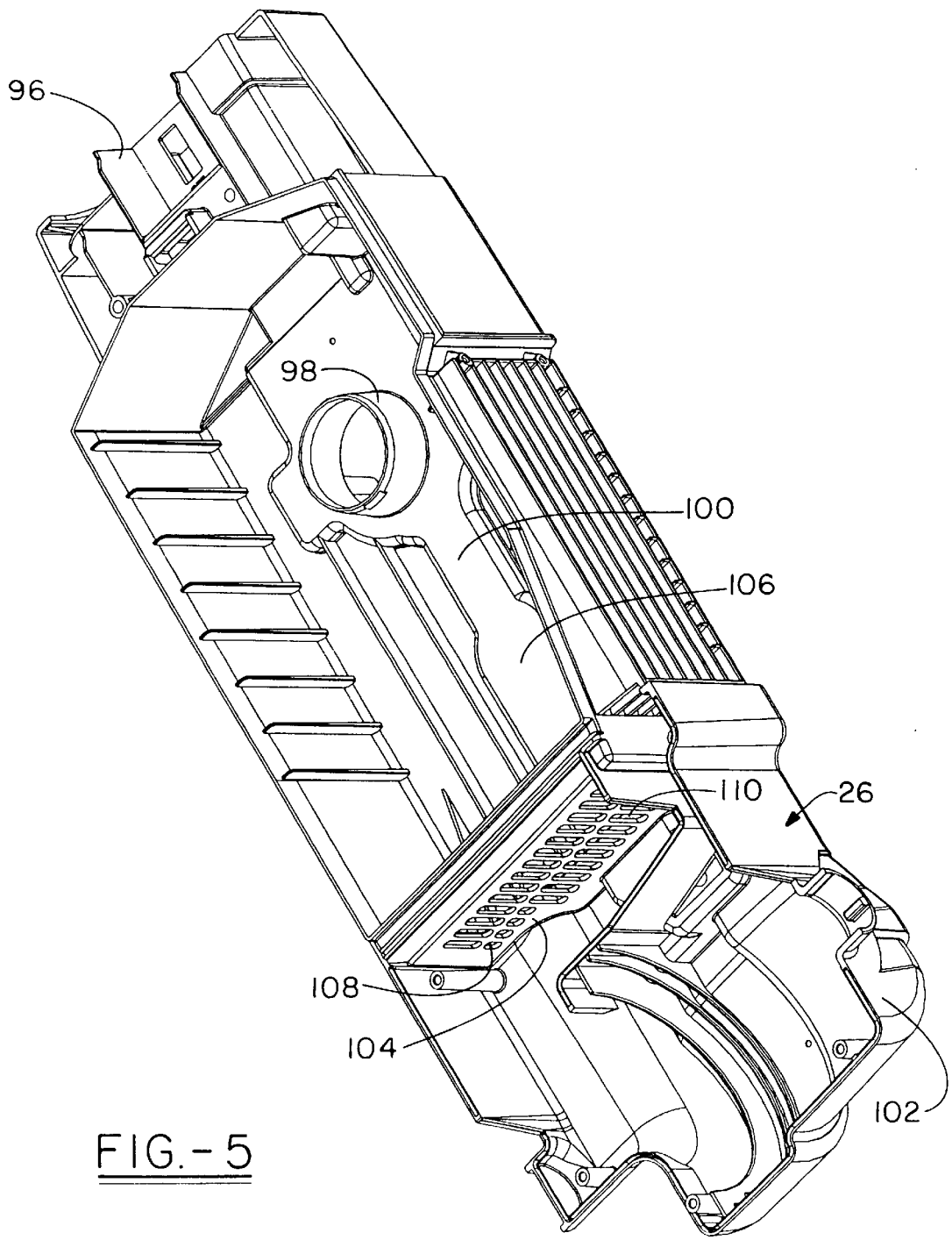
FIG. 5 is a left side inner perspective view of a hard bag utilized with the inventive bag door and looking upwardly.
Figure 6:
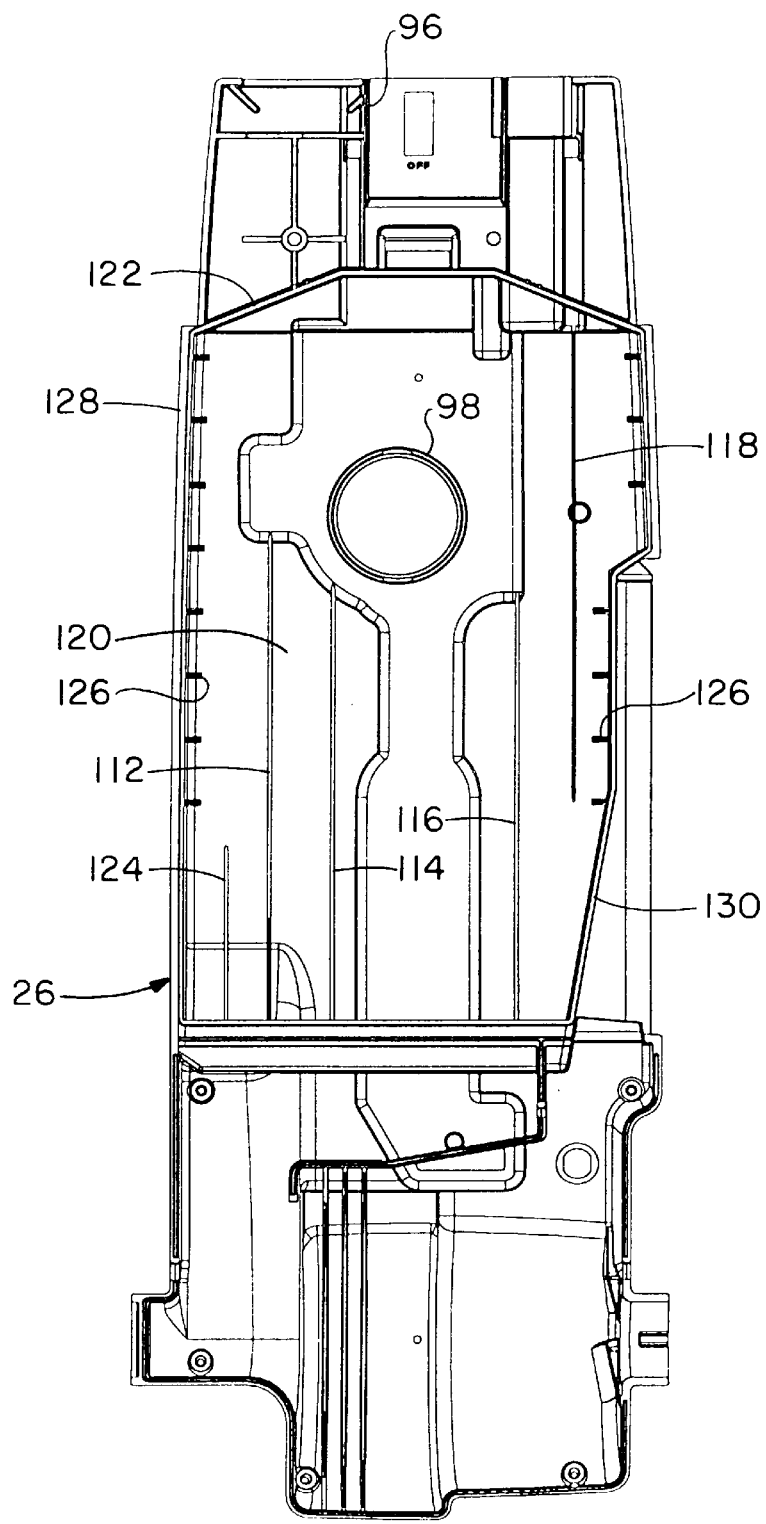
FIG. 6 is a plan view thereof.

There is shown in FIGS. 1–4, a bag door 10 of a hard bag cleaner 12 having a double arched outer top wall 14, a pair of downwardly extending outer side walls 16, 18 a flanged bottom wall 20, with a face wall 22 extending between the top wall 14, side walls 16, 18 and bottom wall 20. An inside surface 24 of face wall 22 forms a portion of the inner bag retaining surface of the volume taken up by a dirt collecting bag (not shown) mounted within a hard bag portion 26 (FIGS. 5 and 6) whose open side is conventionally bounded by the bag door 10. Bag door 10 includes in its upper double arched wall 14 a hand hold depression 25 and on the inner side of upper double arched wall 14 a deformable latch 40.

The bag door 10 includes inner vertical walls 28, 30 which are slightly inset from outer side walls 16, 18 and mirror them for their nearly total height. A series of short ribs 32, 32, etc. extend between the inner and outer walls 16, 18, 28, 30 for bag door strengthening purposes and to form an inset seat for a peripheral seal (not shown) that extends around and between the inner and outer walls 16, 18, 28, 30 and also around a top portion 34 of bag door 10 formed by inner and outer walls 36, 38 of truncated peak form which also have short ribs 32, 32, etc. disposed therebetween. The unsealed space 39 above the walls 36, 38 of the bag door 10 provides an area for the accommodation bag latch 40.

Interiorly of the walls 28, 30, 36, are a series of equally spaced, generally J-shaped turning vane ribs 42, 44, 46, 48 and 50 that are formed integrally with the interior surface 24 of hard bag 10. Each of these vane ribs extends inwardly (from both sides of the bag door 10) towards the center of the bag cavity of the hard bag cleaner 12 from adjacent the inner, vertical walls 28, 30 so as to provide directed airflow inwardly and then downwardly along the bag door 10. These ribs terminate short of a pair of medial, elongated vertically extending strengthening ribs 51, 51.

To provide their J shape, these ribs include J portions 52, 54, 56, 58 and 60, respectively, that extend curvilinearly and then angularly downwardly. This tends to turn the airflow along them downwardly. The J portions are attached to integral straight portions 62, 64, 66, 68, 70, respectively, that extend to the walls 28, 30 so that airflow direction is first inwardly towards the center of the interior surface 24 of bag door 10 and then downwardly between the inner terminations (J portions 52, 54, 56, 58 and 60) of the J-shaped turning vane ribs 42, 44, 46, 48 and 50. The straight portions 62, 64, 66, 68 and 70 of the J shaped ribs 42, 44, 46, 48, 50 shorten from the upper most straight portion 62, and then from each rib straight portion to the next so that a surmounting rib is longer than the one beneath it. This provides the J shaped turning vanes 42, 44, 46, 48 and 50 with a step wise pattern and a flow area that diverges in the downward flow direction along the bag door 10.

The straight portions 62, 64, 66, 68 and 70 of the J shaped vane ribs 42, 44, 46, 48 and 50 merge, at their outer edges, into side ribs 72, 74, 76, 78, and 80 disposed integrally along the inside faces of sides 28 and 30. Each has an outer curvilinear, feathered end 82 to smooth airflow. The side ribs 72, 74, 76, 78 and 80 extend horizontally along the inner faces of these same inner walls 28 and 30. The J shaped ribs 42, 44, 46, 48 and 50, at their inner ends each also include a curvilinear, feathered end 84 also to smooth airflow.

Between the J shaped rib vanes 42, 44, 46, 48 and 50 and also below the last J shaped vane rib 50 are disposed a series of short directing ribs 41, 43, 45, 47 and 49. These ribs, primarily, prevent bag sealing and rupture problems but also aid in airflow. They are also stepped from top to bottom so that the equal airflow paths a, a, a, and a between the J shaped ribs 42 44, 46, 48, and 50 and equal air flow paths b, b, b, b, b formed between them and their companion short directing ribs 43, 45, 47, 49 and 50 are provided and function as the open flow paths therebetween. In a similar manner equal flow paths c, c, c, c and c between one of the short ribs and its next below J-shaped rib are also provided. The air flow paths b and c are also equal to each other to smooth air currents along the bag door 10.

The short directing ribs 41, 43, 45, 47 and 49 each include a curvilinear end 53 to feature the ends of these ribs. They also include side curved and feathered end extension rib portions 55, 57, 59, 61 and 63 like the ends of the side ribs 72, 74, 76, 78 and 80.

The outer flange of bottom wall 20 of bag door 10 also includes a series of horizontally, and vertically extending integral ribs 86, 86, 88, 88, 86, 86 that guide airflow discharged by the J-shaped ribs inwardly from the bag door 10 towards the hard bag portion 26. The ribs 86, 86, 86, 86 are discrete and unattached directly to any other ribbing in the bag door 10 while the ribs 88, 88 form integral angled continuations of medial strengthening ribs 51, 51.

The bag door 20 is completed by a nearly centered rectangular aperture 90 to serve as a mounting port for the mounting of a full bag indicator (not shown) and upper and lower alignment tabs 92, 92, 94 and 94 which help position the bag door 10 when being mounted on the hard bag portion 26. Narrow strengthening ribs 89, 91, 93, 95 and 97 also are provided between opposite, opposed J-shape vent ribs to prevent dishing of the bag door 10 when depressurized.

The hard bag portion 26 (FIGS. 5 and 6) generally includes upper structure 96 for the mounting of a cleaner handle (not shown), a bossed aperture 98 for the sealing receipt of the bag (not shown), a vertically extending inwardly projecting housing portion 100 for the nesting reception of internal electric wiring (disposed on its outer side and not shown) for the hard bag cleaner 12, and a lower motor-fan housing section 102 for the reception of the motor-fan (not shown). As is conventional, the motor-fan causes suction airflow downwardly along the interior surface bag door 10.

To this end, a louvered opening 104 is formed near the bottom of the hard bag portion 26 through which air within its upper cavity 106 is urged to flow downwardly by the motor-fan system of motor-fan housing section 102. The louvered opening 104 includes a series of ventilating slots 108 and 110 which provide confluency between the hard bag portion upper cavity 106 and the motor-fan system within the motor-fan housing section 102. The path of cleaner air flowing to discharge is not an element of this invention but is covered fully in U.S. application Ser. No. 08/780,859 copending, filed 9 Jan. 1997 and owned by a common assignee.

The hard bag portion 26 also includes ribbing to aid in the prevention of bag sealing and to direct air flow downwardly towards louvered opening 104. A series of elongated vertical ribs 112, 114, 116 and 118 are made integral with a front wall 120 of hard bag portion 26. The first three of these ribs extends downwardly from electrical wire storing housing portion 100 and the last extends downwardly from near a top wall 122 of the hard bag portion 26. All terminate close to the level of louvered opening 104. A short lower directing rib 124 disposed outboard of the rib 112 also terminates short of the level of the louvered opening 104.

The hard bag portion 26 also includes a series of side vent ribs 126, 126, etc. disposed on and integral with a pair of opposite sides 128 and 130 of hard bag portion 26. These ribs are generally aligned with all but the two lowest ribs on each side, short directing rib 49 and the last J-shaped rib 50, both of bag door 10. These two ribs are omitted for molding considerations. There is also no side rib on the hard bag portion for the right (FIG. 1) short directing rib 43 due to a change in the angulation of the hard bag portion 26 side wall 130 at this point. These hard bag portion ribs contribute somewhat to air flow efficiency for the hard bag cleaner 12, but the hard bag portion 26, because of its many other functions, cannot be as aerodynamically sound as the bag door 12 whose primary function is as a cover and whose secondary function is as an air flow director.

It should now be clear that the advantages set out at the beginning of the description of the invention have been satisfied by the structure disclosed. It should also be obvious that many modifications could be made to this structure which would still fall within its spirit and purview.

What is claimed is:

1. A hard bag portion of a vacuum cleaner apparatus including:
   J-shaped vane ribs extending along an interior surface of said hard bag cleaner portion to guide air flow therealong; and
   short straight ribs interposed between said J-shaped vane ribs.
2. A hard bag as set out in claim 1 wherein:
   a) said hard bag portion is a bag door.
3. The hard bag portion as set out in claim 1 wherein:
   a) said J-shaped vane ribs are stepped in length to thereby provide an expanding flow area of said air flow along said interior surface of said hard bag cleaner portion.
4. The hard bag portion as set out in claim 3 wherein:
   a) said short ribs are also stepped to help provide said expanding flow area.
5. The hard bag portion as set out in claim 4 wherein:
   a) the air flow area between each said J-shaped vane rib is fairly equal.

6. The hard bag portion as set out in claim 5 wherein:
a) the air flow area between each said short rib and the corresponding said J-shaped vane rib thereabove it is equalized.

7. The hard bag portion set out in claim 6 wherein:
a) the air flow area between each said short rib and the corresponding said J-shaped vane rib therebelow it is equalized.

8. The hard bag portion as set out in claim 7 wherein:
a) said hard bag cleaner portion includes an inner bottom side; and
b) upstanding ribs extend along said inner bottom side.

9. The hard bag portion as set out in claim 8 wherein:
a) said expanding flow area is disposed medial of said inner surface and extends from the top to the bottom thereof.

10. The hard bag portion as set out in claim 9 wherein:
a) a pair of medially disposed vertically extending center support ribs are also disposed on said inner surface of said hard bag portion.

11. The hard bag portion as set out in claim 10 wherein:
a) said pair of medially disposed vertically extending center support ribs divide said expanding flow area.

12. The hard bag portion as set out in claim 11 wherein:
a) at least one leg of said J-shaped vane rib is disposed partially angularly.

13. A hard bag portion of a vacuum cleaner apparatus having:

an internal surface having a top and a bottom;

vane ribbing on said internal surface tending to guide air flow therealong downwardly from the top to the bottom of said internal surface; and a bottom inside surface on said hard bag portion having ribs extending continuously from a front to a rear of the bottom inside surface to form separate and distinct air flow channels which tend to move said downward air flow inwardly away from the internal surface.

* * * * *

UNITED STATES PATENT AND TRADEMARK OFFICE
CERTIFICATE OF CORRECTION

PATENT NO. : 5,863,309
DATED : January 26, 1999
INVENTOR(S) : Louis et al.

It is certified that error appears in the above-identified patent and that said Letters Patent are hereby corrected as shown below:

Page 1, column 1, line 14, The Assignee field should be added to read:
    The Hoover Company, North Canton, Ohio Signed and Sealed this Twenty-ninth Day of May, 2001

Attest:

NICHOLAS P. GODICI

Attesting Officer      Acting Director of the United States Patent and Trademark Office